Nov. 17, 1959  M. D. WELSH  2,913,249
BABY STROLLER
Filed June 4, 1956

INVENTOR.
MATILDA D. WELSH
BY
ATTORNEY

2,913,249
BABY STROLLER
Matilda D. Welsh, Ladue, Mo.

Application June 4, 1956, Serial No. 589,063

3 Claims. (Cl. 280—36)

This invention pertains to the structure of baby strollers, particularly of the collapsible type. Many such strollers are constructed with a subframe, the rear ends of the side bars of such frame being perforated to receive the rear axle. The rear wheels are usually mounted on said axle outside of said frame ends. It has been found that this construction is weak in that the subframe is not rigid laterally and is subject to damage from side shocks.

An object of this invention, therefore, is to provide a structure in which the free ends of the subframe are supported against such side shocks.

Another object is to fix the rear axle against rotation so as to avoid undue wear at the points where it engages the frame.

In accordance with this invention, generally stated, the axle bar is provided with stops, in the form of spline members, and the ends of the subframe, which is usually tubular, are provided with perforations passing through both tube-walls, the perforations in the inner walls only having slot extensions to receive said spline members. The axle is assembled by springing the side bars of the subframe apart to insert the axle in said perforations. The spline members then enter the slot extensions in the inner wall and engage the outer wall as a stop to prevent collapse of the side bars.

A preferred embodiment of this invention is illustrated in the accompanying drawing, in which Fig. 1 is a rear view of a stroller structure embodying this invention;

Figure 1:
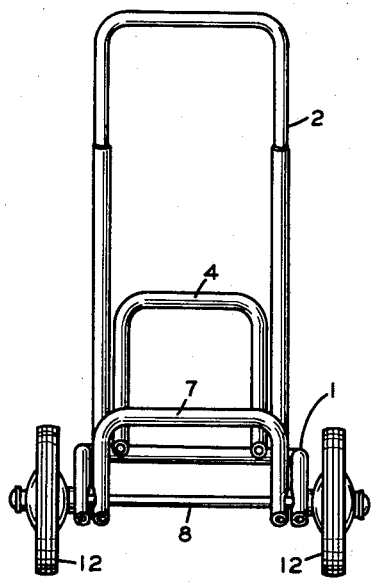
Figure 2:
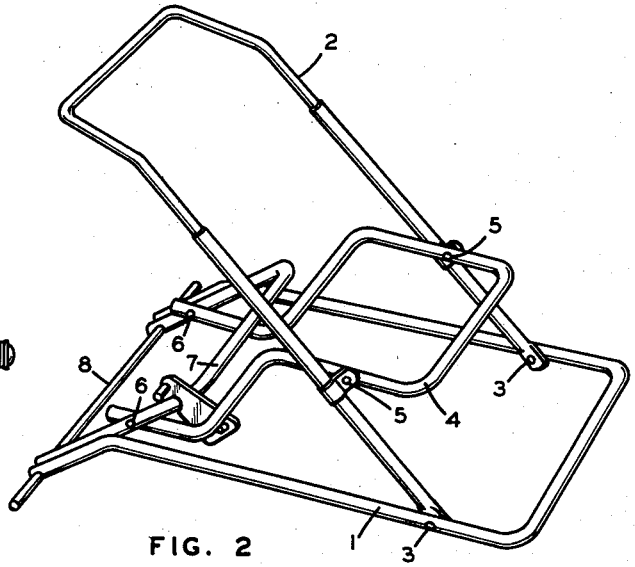
Fig. 2 is a perspective view of such structure without the wheels.

As shown in the drawing, 1 designates the subframe of the stroller, which in the embodiment shown, is made of tubing and U-shaped with the free ends of the U directed toward the rear of the stroller. A handle-bar 2, also U-shaped is pivoted at 3, 3 to the side bars of the subframe. A seat frame 4, of the special shape shown, is pivoted at 5, 5 to the handle bar 2. The rear ends of the frame 4 are pivoted at 6, 6 to a U-shaped toggle frame 7. A suitable seat, not shown, for the baby is hung from the frame 4.

Figure 4:
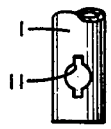
Fig. 4 is an enlarged detail showing the perforation with slot extensions to receive the spline members, as viewed from 4—4 in Fig. 3.
Figure 5:
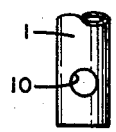
Fig. 5 is a similar view showing the perforation without slot extensions, as viewed from 5—5 in Fig. 3.
Figure 3:
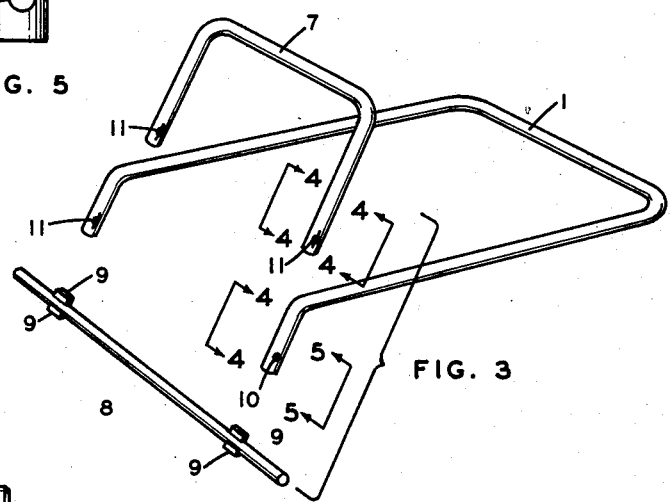
Fig. 3 is an "exploded" view of part of the structure.

The free ends of the side bars of the frames 1 and 7 are pierced by transverse perforations in which an axle bar 8 is mounted. The bar 8 has spline members 9 struck up thereon at points suitably spaced from its ends. The perforations in the outer walls of the tube forming the subframe 1 are round as shown at 10 in Figs. 3 and 5. The perforations in the inner walls of said tube, as well as those in both tube walls at the ends of the frame 7, are formed with slot extensions, as shown at 11 in Figs. 3 and 4, such as to permit the spline members 9 to pass therethrough.

Figure 6:
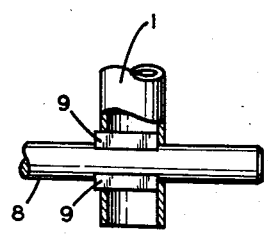
Fig. 6 is a detail, partly in section, showing the manner of assembling the axle bar.

In assembling this part of the structure the axle bar 8 is first slipped through the perforations 11 of the frame 7, the spline members 9 passing through the tube to the outside of that frame. One end of the bar 8 is then passed into the perforations in one of the side bars of the frame 1 from the inside of the frame. In this operation the spline members 9 will pass through the perforation 11 in the inside wall of the tube but will be stopped by the outside wall as shown in Fig. 6. The free ends of the side bars of the frame 1 are then sprung apart and the other end of the axle bar 8 inserted in the perforations therein in a similar manner. Ground wheels 12 may then be mounted on the protruding ends of the bar 8.

It will be seen that this provides a rigid structure for the subframe 1 as the spline members 9 act as stops to prevent inward movement of the side bars under shock, as when the stroller is dropped, or the like. These splines also prevent the axle 8 from turning by their engagement with the slot extensions of the perforations 11 in the inner tube wall as shown in Fig. 6. This prevents the excessive wear that often takes place at the points where the axle passes through the free ends of the subframe 1.

Various changes may be made in the details of construction, within the scope of the appended claims, without departing from the spirit of this invention. Parts of the invention may be used without the whole and improvements may be added while retaining some or all of the advantages of the invention.

I claim:

1. In a baby stroller having a collapsible frame, a U-shaped tubular subframe and an axle bar having spline members thereon near the ends thereof, the open ends of said subframe having perforations therein adapted to receive said axle bar, the perforation on the inner side of the tube at each of said ends being formed with a slot extension to pass said spline member, and the perforation on the outer side of each of said ends being without such slot extensions to provide a stop for said spline member.

2. A structure for a baby stroller in accordance with claim 1 having a U-shaped toggle frame pivoted at its open ends on said axle bar between the ends of said subframe, the pivot holes in said toggle frame being formed with slot extensions in all four tube-walls thereof so as to pass said spline member for assembly of said toggle frame on said axle bar.

3. In a stroller construction, an axle bar having protuberances fixed thereon near the ends thereof and extending laterally outward, a frame having spaced apart members with aligned perforations therethrough adapted to receive the axle bar, each of said frame members having a recess formed on the inner side thereof in communication with the perforation and extending laterally outward from said perforation to pass the axle bar protuberance, the axle bar extending through the perforations in said frame members, said fixed lateral protuberances being positioned in the recesses of said frame members and engaging the inner side of the frame members defining said recesses to prevent rotation of the axle in the frame members and engaging the outer side of the frame members to provide stops maintaining the frame members in spaced relationship.

References Cited in the file of this patent

UNITED STATES PATENTS

| 490,288 | Hubbard | Jan. 24, 1893 |
|---|---|---|
| 648,653 | Clouse | May 1, 1900 |
| 2,597,765 | Welburn | May 20, 1952 |
| 2,728,580 | Preisler | Dec. 27, 1955 |
| 2,760,647 | Saul | Aug. 28, 1956 |